(12) United States Patent
Gupta et al.

(10) Patent No.: US 8,448,238 B1
(45) Date of Patent: May 21, 2013

(54) NETWORK SECURITY AS A SERVICE USING VIRTUAL SECURE CHANNELS

(71) Applicants: Sandeep K. Gupta, Ottawa (CA); Zane M. Taylor, Santa Clara, CA (US); Sherman S. Tang, Redondo Beach, CA (US)

(72) Inventors: Sandeep K. Gupta, Ottawa (CA); Zane M. Taylor, Santa Clara, CA (US); Sherman S. Tang, Redondo Beach, CA (US)

(73) Assignee: Sideband Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/748,517

(22) Filed: Jan. 23, 2013

(51) Int. Cl.
*G06F 9/00* (2006.01)

(52) U.S. Cl.
USPC .......................................................... 726/15

(58) Field of Classification Search
USPC .......................................................... 726/15
See application file for complete search history.

(56) References Cited

U.S. PATENT DOCUMENTS

| | | |
|---|---|---|
| 6,970,459 B1 | 11/2005 | Meier |
| 7,496,097 B2 | 2/2009 | Rao et al. |
| 7,519,056 B2 | 4/2009 | Ishwar et al. |
| 7,624,429 B2 | 11/2009 | Van Ackere et al. |
| 7,673,133 B2 | 3/2010 | Wesemann |
| 7,984,496 B2 | 7/2011 | Loh |
| 8,028,329 B2 | 9/2011 | Whitcomb |
| 8,127,350 B2 | 2/2012 | Wei et al. |
| 8,239,934 B2 | 8/2012 | Brown et al. |
| 8,266,266 B2 | 9/2012 | Short et al. |
| 8,300,614 B2 | 10/2012 | Ankaiah et al. |
| 2007/0186281 A1 | 8/2007 | McAlister |
| 2010/0189004 A1 | 7/2010 | Mirandette et al. |
| 2012/0246484 A1 | 9/2012 | Blaisdell et al. |
| 2012/0246731 A1 | 9/2012 | Blaisdell et al. |

OTHER PUBLICATIONS

Marco Casassa Mont and Boris Balacheff, "On Device-based Identity Management in Enterprises," Paper, Apr. 18, 2007, Hewlett-Packard Development Company, L.P., Bristol, UK.
Chii-Ren Tsai, "Non-Repudiation in Practice," Paper, Citigroup Information Security Office, Silver Spring, Maryland, USA.
(Author Unknown), "Software-Defined Networking: The New Norm for Networks," Paper, Apr. 13, 2012, Open Networking Foundation.
Barton McKinley, "The ABCs of PKI," Online article, Jan. 17, 2000, Network World.
(Author Unknown), "International Telecommunication Union Frequently Asked Questions," Web page, Updated Mar. 8, 2001, International Telecommunication Union, http://www.itu.int/ITU-R/terrestrial/faq/index.html.
(Author Unknown), "Radiocommunication Sector: Terrestrial Services," Web page, Updated Nov. 30, 2011, International Telecommunication Union, http://www.itu.int/ITU-R/index.asp?category=terrestrial&rlink=terrestrial&lang=en.
(Author Unknown), "Spectrum Topics on Data," Web page, Date accessed Jan. 23, 2013, Federal Communications Commission, http://www.fcc.gov/spectrum.
(Author Unknown), "Radio Spectrum Allocation," Web page, Mar. 2, 2011, Federal Communications Commission, http://www.fcc.gov/encyclopedia/radio-spectrum-allocation.
(Author Unknown), "About the 3rd Generation Partnership Project," Web page, Date accessed Jan. 23, 2013, 3GPP, http://www.3gpp.org/About-3GPP.

*Primary Examiner* — Jacob Lipman
(74) *Attorney, Agent, or Firm* — Raj Abhyanker, P.C.

(57) ABSTRACT

Disclosed are methods, devices, and systems to provide an end-to-end secure transaction over a software defined network (SDN). In one embodiment, a machine-implemented method comprises opening an in-band virtual secure channel (VSC) or an out-of-band VSC over the SDN; authenticating, through the control plane of a switch managing the SDN, a user of a resource over the in-band VSC or the out-of-band VSC; authorizing the user, through the control plane, access to the resource over the in-band VSC or the out-of-band VSC; and accounting for a transaction conducted by the user accessing the resource, through the control plane, over the in-band VSC or the out-of-band VSC. In another embodiment, a switch to manage the SDN and to implement the method described herein is disclosed.

20 Claims, 9 Drawing Sheets

NETWORK SECURITY AS A SERVICE USING VIRTUAL SECURE CHANNELS

CLAIM OF PRIORITY

This application is a non-provisional application claiming priority to U.S. Provisional Patent Application Ser. No. 61/748,049 titled: "NETWORK SECURITY AS A SERVICE USING VIRTUAL SECURE CHANNELS," filed on Dec. 31, 2012.

INCORPORATION BY REFERENCE

This application incorporates by reference U.S. patent application Ser. No. 13/726,491 titled: "METADATA-DRIVEN SWITCH NETWORK CONTROL," filed on Dec. 24, 2012, in its entirety.

FIELD OF TECHNOLOGY

This disclosure relates generally to network security technology, in one example embodiment, to methods and devices to provide network security to a user of a software defined network (SDN).

BACKGROUND

Demand for a more secure network switching infrastructure has increased with the proliferation of mobile and/or untethered computing devices (such as supervisory control and data access (SCADA) systems, industrial control systems, transportation systems, smartphones, tablet computers, set-top boxes, and hotspot devices). Applications and web browsers running on such devices and over such an infrastructure may be susceptible to attacks by malicious agents at a resource level, or at a resource flow level (such as eavesdropping, key loggers, worms, viruses, Trojan horses, or spoofing attacks). While security experts have developed increasingly complex means of securing traffic flow (such as networking protocols, encryption tunnels, and key generation and authentication systems), the challenge remains to secure a transaction from its origination on a client device to its destination behind a switch, while providing a means for non-repudiation.

The field of network security also shares the common goals of confidentiality, integrity, and availability. Confidentiality in network security solutions may be compromised in systems that administer and transfer keys. These systems may rely on physical access to a certification authority, a connection that may not be supported or maintained by mobile clients using a wide area network (WAN). Furthermore, in systems implementing a network layer socket management service, malware may install itself at the operating system, network, transport, or application layer and redirect traffic to malicious servers.

In addition, network security switches and routers may adopt a blacklist approach to prevent malicious agents from connecting to a network and compromising the security of the network. However, a blacklist may implement a draconian set of rules or regular expressions to locate and filter out malicious traffic. To circumvent this, a malicious agent may simply change a single bit to evade the most sophisticated traffic management and malware detection system.

SUMMARY

Disclosed are methods, devices, and systems to provide an end-to-end secure transaction over a software defined network (SDN). In one aspect, a machine-implemented method includes: opening an in-band virtual secure channel (VSC) or an out-of-band VSC over the SDN; authenticating, through the control plane of a switch managing the SDN, a user of a resource over the in-band VSC or the out-of-band VSC; authorizing the user, through the control plane, access to the resource over the in-band VSC or the out-of-band VSC; and accounting for a transaction conducted by the user accessing the resource, through the control plane, over the in-band VSC or the out-of-band VSC.

The in-band VSC or the out-of-band VSC may be opened at a resource level, a resource flow level, or a network level using a user identity, a client device identity, and/or a resource identity distributed through a public key infrastructure (PKI). The method may also involve receiving a configuration data from a client device of the user, through a near field communication (NFC) chip embedded in the switch, and issuing a health data of the switch to the client device through the NFC chip. The method may further involve authenticating the user of the resource by comparing a user identity against a stored identity in an authentication database of the control plane of the switch. In this case, the user identity may be received through the in-band VSC or the out-of-band VSC.

At a resource level, all traffic for a specific resource or application may be encapsulated in a single VSC irrespective of the number of unique flows generated for that resource. At a resource flow level, all traffic from a specific user, device, or resource may be encapsulated in multiple VSCs according to the unique flow of traffic. At a network level, traffic may be encapsulated according to specific source and destination network addresses without regard to the resource or the flows.

The method may include authorizing the user's access to the resource by: generating, through the control plane, a one-time encrypted software token (EST) for the user based on a key agreement technique and a user identity, a client device identity, and/or a resource identity; storing the one-time EST generated in a key management database of the control plane; analyzing and comparing, through a hash comparison engine of the control plane, a hash of an independently generated EST received from the user against the one-time EST stored in the key management database; and granting the user access to the resource through the in-band VSC or the out-of-band VSC based on a result of the comparison.

The method may additionally involve accounting for a transaction conducted by the user accessing the resource in near real-time by storing a historical and a near real-time information related to the user, a client device used by the user, the resource, the transaction, the in-band VSC, and/or the out-of-band VSC in an accounting database of the control plane. The transaction conducted by the user may also be accounted for by: performing, through a data plane of the switch managing the SDN, a deep-packet-inspection (DPI) of a data packet transmitted through the in-band VSC or the out-of-band VSC and filtering out, through the data plane of the switch managing the SDN, a data packet not transmitted through the in-band VSC or the out-of-band VSC.

The transaction conducted by the user may further be accounted for by: identifying, through a data plane of the switch managing the SDN, a true source and a destination of a malicious data packet transmitted through the in-band VSC or the out-of-band VSC and redirecting and duplicating, through the data plane of the switch managing the SDN, in near-real time, the malicious data packet for further analysis. The method may also involve accounting for the transaction conducted by the user by checking, through a data plane of the switch managing the SDN, an application on the client device of the user against a verified version of the application presented in a third-party application and application reputation store through the in-band VSC or the out-of-band VSC and checking, through the data plane of the switch, an operating system and an operating system kernel on the client device of the user against a verified version of the operating system and the operating system kernel through the in-band VSC or the out-of-band VSC.

Finally, the transaction conducted by the user may be accounted for by issuing, through a data plane of the switch managing the SDN, an update for the application, the operating system, and/or the operating system kernel through the in-band VSC or the out-of-band VSC.

In another aspect, a switch to manage a software defined network (SDN) comprises one or more off load engines, one or more host processors, and one or more co-processors embedded in the switch; one or more near field communication (NFC) chips communicatively coupled to the one or more host processors; one or more storage devices communicatively coupled to the one or more off load engines and co-processors; and one or more programs. The one or more programs are stored in the one or more storage devices and are executable by the one or more off load engines and co-processors.

In addition, the one or more programs comprise instructions to open an in-band VSC or an out-of-band VSC over the SDN; instructions to authenticate, through the control plane of the switch, a user of a resource over the in-band VSC or the out-of-band VSC; instructions to authorize the user, through the control plane, access to the resource over the in-band VSC or the out-of-band VSC; and instructions to account, for a transaction conducted by the user accessing the resource, through the control plane, over the in-band VSC or the out-of-band VSC. The in-band VSC or the out-of-band VSC may be opened at one of a resource level, a resource flow level, or a network level using a user identity, a client device identity, and/or a resource identity distributed through a public key infrastructure.

The one or more programs may also comprise instructions to receive a configuration data from a client device of the user, through an NFC chip embedded in the switch, and issue a health data of the switch to the client device through the NFC chip. One of the storage devices may also comprise instructions to authenticate the user of the resource by comparing a user identity against a stored identity in an authentication database of the control plane. The user identity may be received through the in-band VSC or the out-of-band VSC.

The one or more programs may also comprise instructions to authorize the user's access to the resource with further instructions to: generate, through the control plane, a one-time EST for the user based on a key agreement technique and a user identity, a client device identity, and/or a resource identity; store the one-time EST generated in a key management database of the control plane; analyze and compare, through a hash comparison engine of the control plane, a hash of an independently generated EST received from the user against the one-time EST stored in the key management database; and grant the user access to the resource through the in-band VSC or the out-of-band VSC based on a result of the comparison.

In addition, the one or more programs may comprise instructions to account for a transaction conducted by the user accessing the resource in near real-time by storing a historical and a near real-time information related to the user, a client device used by the user, the resource, the transaction, the in-band VSC, and/or the out-of-band VSC in an accounting database of the control plane. The instructions to account for a transaction conducted by the user may comprise further instructions to: perform, through a data plane of the switch, a deep-packet-inspection (DPI) of a data packet transmitted through the in-band VSC or the out-of-band VSC and filter out, through the data plane of the switch, a data packet not transmitted through the in-band VSC or the out-of-band VSC. Further instructions to account for a transaction conducted by the user may include instructions to: identify, through a data plane of the switch, a true source and a destination of a malicious data packet transmitted through the in-band VSC or the out-of-band VSC, and redirect and duplicate, through the data plane of the switch, in near-real time the malicious data packet for further analysis. This allows for a near real time security incident handling process to be initiated while an attack is in progress.

The one or more programs may also comprise instructions to account for a transaction conducted by the user with further instructions to check, through a data plane of the switch, an application on the client device of the user against a verified version of the application presented in a third-party application and application reputation store through the in-band VSC or the out-of-band VSC. Moreover, the one or more programs may comprise instructions to check, through a data plane of the switch, an operating system and an operating system kernel on the client device of the user against a verified version of the operating system and the operating system kernel through the in-band VSC or the out-of-band VSC and issue, through a data plane of the switch, an update for the application, the operating system, and/or the operating system kernel through the in-band VSC or the out-of-band VSC.

The methods and systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

Other features of the present embodiments will be apparent from the accompanying drawings and from the detailed description that follows.

DETAILED DESCRIPTION

Disclosed are methods and devices to provide an end-to-end secure transaction over a software defined network (SDN). Although the present embodiments have been described with reference to specific example embodiments, it will be evident that various modifications and changes may be made to these embodiments without departing from the broader spirit and scope of the various embodiments. It should be understood by one of ordinary skill in the art that the terms "application(s)," "program(s)," "software," "software code," "sub-program(s)," "module(s)," and "block(s)" are industry terms that refer to computing instructions stored in a memory or storage device of a processing device and executable by a processor of the processing device.

Figure 1:
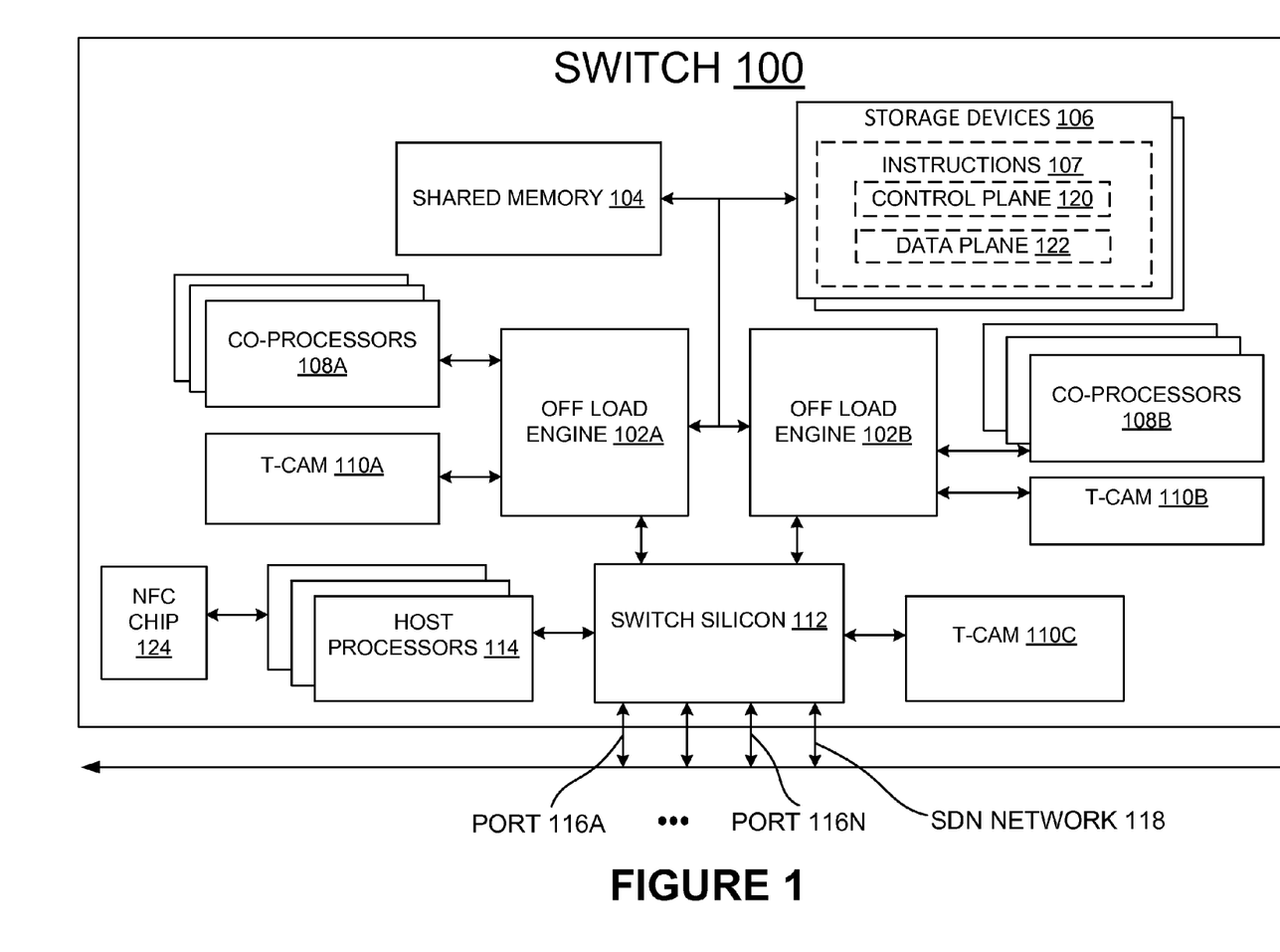
FIG. 1 illustrates a switch to manage a SDN, according to one or more embodiments.

Reference is now made to FIG. 1, which illustrates a block diagram of a switch 100 used to control or manage a SDN 118. In one or more embodiments, the switch 100 comprises one or more off load engines (for example, off load engines 102A and 102B) coupled to one or more co-processors (for example, co-processors 108A and 108B). In one or more embodiments, an off load engine, such as off load engine 102A, may be a server grade processor (e.g., a processor comprising at least 8 cores and operating at a minimum clock speed of 1.8 gigahertz (GHz)). In one embodiment, off load engines 102A and 102B may be cryptographic and deep packet inspection (DPI) off load engines. The co-processors (for example, co-processors 108A and 108B) may be additional off load engines (or a processor with equivalent processing power) and may take on processing duties when the primary off load engines (for example, off load engines 102A and 102B) are overloaded. It should be understood by one of ordinary skill in the art that the terms off load engine and co-processors are industry terms that refer to computing processors in a physical network switch.

In the example embodiment shown in FIG. 1, the switch 100 may comprise off load engine 102A and off load engine 102B. In this embodiment, off load engine 102A may be coupled to one or more co-processors 108A and off load engine 102B may be coupled to one or more co-processors 108B. In this same embodiment, the off load engine 102A may also be coupled to a ternary content addressable memory (T-CAM) 110A and the off load engine 102B may also be coupled to another T-CAM 110B. A T-CAM refers to a form of high-speed memory hardwired with low-level computing applications or programs. The T-CAM may comprise of both volatile and non-volatile memory. While the most commonly implemented CAMs are known as binary CAMs. Such components only search for ones and zeros. A T-CAM allows the processor to access a third state, or "X" state. The X state may be a "mask," meaning its value may be anything. This additional capability is especially useful when used to perform networking, encryption, and deep packet inspection (DPI) operations at rates as high as 40 gigabits per second to 100 gigabits per second. When performing calculations, bits are first masked and then logical operations are performed on the rest of the data packet. A network switch may store entire routing tables in T-CAM for easy lookup. In one embodiment, each off load engine embedded in the switch 100 may have one or more T-CAMs coupled to the off load engine. In this same embodiment, one or more T-CAMs (for example, T-CAM 110C in FIG. 1) may store re-writable or upgradeable microcode that may be used to instruct a switch silicon 112 by translating machine instructions into a sequence of circuit-level operations.

Both off load engines 102A and 102B may also be coupled to a shared memory 104, which, in turn, may be coupled to one or more storage devices 106. As indicated in FIG. 1, at least one of the storage devices 106 may comprise of instructions 107 to control a control plane 120 and a data plane 122 of the switch 100.

Shared memory 104 may be any form of non-volatile random access memory (NVRAM) in combination with a dynamic random access memory (DRAM) embedded in the switch 100. The shared memory 104 may be used to temporarily store data that the one or more off load engines (for example, off load engines 102A and 102B) and co-processors (for example, co-processors 108A and 108B) are using for an operation.

Both off load engines 102A and 102B may also be coupled to the switch silicon 112, which may, itself, be coupled to one or more host processors 114. It is understood by one of ordinary skill in the art that a switch silicon refers to a switch integrated circuit chip capable of routing network traffic. In one embodiment, the switch silicon 112 is any switch chip with at least 64 ports and a minimum aggregate bandwidth throughput of 640 gigabits per second (GBPS). The one or more host processors 114 may be used to operate the switch silicon 112. In one embodiment, the data plane 122 (also see FIG. 2) may refer to components of the switch silicon 112 used to route network traffic through the switch 100.

Figure 2:
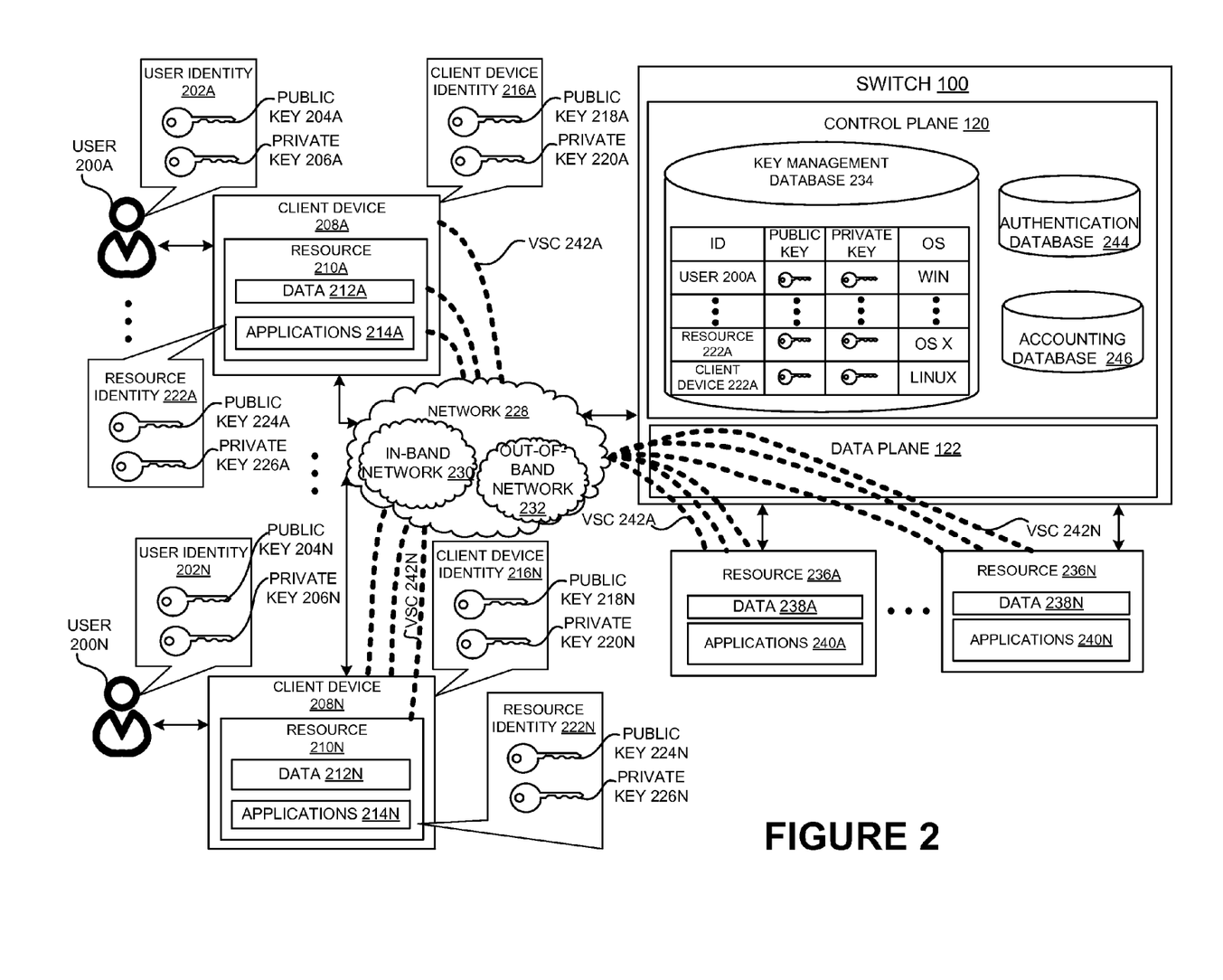
FIG. 2 illustrates the switch of FIG. 1 opening one or more in-band or out-of-band VSCs over the SDN, according to one or more embodiments.

Moreover, a near field communication (NFC) chip 124 may be coupled to the one or more host processors 114 and may be used by a user 200A (see FIG. 2) to provision the switch 100 through a client device 208A (see FIG. 2). The NFC chip 124 may be any NFC tag operating on an ISM radio band approved by the NFC Forum and satisfying the requirements of ISO/IEC 18000-3, ISO/IEC 14443, or JIS X 6319-4.

In one or more embodiments, the switch 100 may be the metadata-driven switch described in U.S. patent application Ser. No. 13/726,491.

Reference is now made to FIG. 2, which illustrates the switch 100 of FIG. 1 opening one or more in-band or out-of-band VSCs (for example, VSC 242A to VSC 242N) over the SDN, according to one or more embodiments. It should be understood by one of ordinary skill in the art of network security that a SDN refers to a network architecture where network traffic is controlled using software without requiring the network administrator to have access to the network's hardware devices. A switch used to manage the SDN (such as switch 100) may decouple the control of the network, through a control plane (such as control plane 120) of the switch, from the switching or forwarding of network traffic, through a data plane (such as data plane 122) of the switch.

In one embodiment, the switch 100 managing an SDN may open one or more in-band VSCs or out-of-band VSCs (for example, VSC 242A to VSC 242N) over the SDN. Once a VSC is established, all data packets transmitted through the VSC may be encrypted and decrypted using mutual authenticated digital signatures. In one embodiment, the in-band and out-of-band VSC (for example, VSC 242A to VSC 242N) may operate on an internet layer of TCP/IP using an Internet Key Exchange (IKE or IKEv2) protocol and an Internet Protocol Security (IPsec) complying with Request for Comment (RFC) 6071. In another embodiment, the switch 100 may open one or more in-band VSCs or out-of-band VSCs (for example, VSC 242A to VSC 242N) over the SDN using a transport layer security (TLS) protocol operating on an upper layer of TCP/IP complying with RFC 6176.

In one embodiment, an in-band VSC may refer to a VSC opened over an in-band network 230. This in-band network 230 may be a wired or a wireless network where the wireless network is established over a licensed radio frequency (RF) band. In addition, an out-of-band VSC may refer to a VSC opened over an out-of-band network 232. This out-of-band network 232 may be a wireless network established over an unlicensed RF band (e.g., an ISM radio band). For additional information regarding unlicensed RF bands, please refer to: the International Telecommunication Union Frequently Asked Questions page, http://www.itu.int/ITU-R/terrestrial/faq/index.html; the $3^{rd}$ Generation Partnership Project (3GPP), http://www.3gpp.org/; and the Federal Communications Commission's Spectrum Topics, http://www.fcc.gov/spectrum and Encyclopedia, http://www.fcc.gov/encyclopedia/radio-spectrum-allocation.

As depicted in FIG. 2, the switch 100 comprises a control plane 120 and a data plane 122. The control plane 120 further comprises a key management database 234, an authentication database 244, and an accounting database 246. While the VSCs and the network traffic carried by the VSCs are forwarded through the data plane 122 of the switch, the control plane 120 stores information transmitted through the VSCs and controls how network traffic is forwarded through the data plane 122.

In FIG. 2, VSC 242A to VSC 242N may refer to any number of VSCs established over the in-band network 230 or the out-of-band network 232. In one or more embodiments, an in-band VSC or an out-of-band VSC may be opened at a resource level, a resource flow level, or a network level using a user identity, a client device identity, or a resource identity distributed through a public key infrastructure (PKI).

In the exemplary embodiment shown in FIG. 2, user 200A may be assigned a user identity 202A by a network administrator. The user identity 202A may comprise a public key 204A and a private key 206A. The user identity 202A may comprise of information known only to the user 200A, such as a username or password, and may be used by the PKI to create the public key 204A and the private key 206A. While a public key 204A can be sent through the one or more VSCs, the user 200A's private key 206A cannot be shared with anyone other than the user 200A. In FIG. 2, the user 200A uses a client device 208A to access a resource 210A on the client device 208A or a resource 236A behind the switch 100. In either case, the client device 208A may be assigned a client device identity 216A comprising a public key 218A and a private key 220A. The user identity 202A and the client device identity 216A may be stored in a trusted platform module (TPM) of the client device 208A, which is understood by one with ordinary skill in the art to mean a cryptographic off load processor designed to store cryptographic keys on a network-enabled device. The client device identity 216A may comprise of information related to a manufacturer of the client device 208A, an operating system running on the client device 208A, a serial number of the client device 208A, and/or a memory type installed on the client device 208A used by the PKI to create the public key 218A and the private key 220A.

In one embodiment, the client devices indicated in FIG. 2 (208A-208N) may refer to a network enabled processing device (e.g., SCADA, ICS, smartphone, mobile phone, tablet computer, laptop, computer, etc.). In another embodiment, the client devices indicated in FIG. 2 (208A-208N) may refer to a network enabled apparatus (e.g., a network enabled security camera, network enabled walkie-talkie, network enabled thermostat, etc.). In a further embodiment, the client devices indicated in FIG. 2 (208A-208N) may refer to an enclave device coupled to a network enabled processing device.

Moreover, the resource 210A may also be assigned a resource identity 222A comprising a public key 224A and a private key 226A. In this embodiment, a resource (such as resource 210A) may refer to a set of data, an application, or access to a network such as a wide area network (WAN) (e.g., the Internet) or an enterprise network or intranet. While resource 210A may be stored in a memory of the client device 208A, the resource 210A may also be an application layer or presentation layer of a resource residing on an application server behind the switch 100. For example, resource 236A may be ultimately accessed by the user 200A when the user 200A inputs commands into the presentation layer of the resource (such as resource 210A).

As depicted in FIG. 2, VSC 242A may be an in-band VSC opened at a network level from the client device 208A through the in-band network 230 and ending at the resource 236A. In this embodiment, the VSC 242A may carry network traffic for various applications on the client device 208A (e.g., email traffic, web browsing traffic, VoIP traffic, etc.). In another embodiment, the VSC 242N may be an out-of-band VSC opened at a resource level from resource 210N on client device 208N through the out-of-band network 232 to resource 236N. The VSC 242N may carry network traffic exclusively for the resource 210N (e.g., enterprise application traffic). Network traffic through all such VSCs, including VSC 242A and VSC 242N, may be forwarded or directed through the data plane 122 of the switch 100. In another embodiment, the VSC may carry traffic at a resource flow level when the resource requires communication with multiple destinations, such as a web browser.

In one embodiment, the VSC 242A may be opened for a pre-determined period of time. In another embodiment, the VSC 242A may be opened for as long as a resource is being used by the user 200A. In a further embodiment, the VSC 242A may close as soon as a malicious agent is detected on the SDN, or as soon as a transaction is completed to mitigate risk from a malicious agent Also depicted in FIG. 2 is the switch 100's control plane 120 comprising the key management database 234, the authentication database 244, and the accounting database 246. In one embodiment, the key management database 234 may include a lightweight directory access protocol (LDAP) database storing information related to a user identity, a client device identity, or a resource identity. The key management database 234 may share information with the authentication database 244 and the accounting database 246.

In addition to the aforementioned users, client devices, and resources, it should be understood by one of ordinary skill in the art of network security that the switch 100 may accommodate any number of users (ranging from user 200A to user 200N), client devices (ranging from client device 208A to client device 208N), and resources (ranging from resource 210A to resource 210N) up to the switching capacity of the data plane 122 of the switch 100. It should also be understood by one of ordinary skill in the art that the switch 100 may be connected to other switches on the SDN to form a switch system that may extend the switch capability of the data plane 122.

Figure 3:
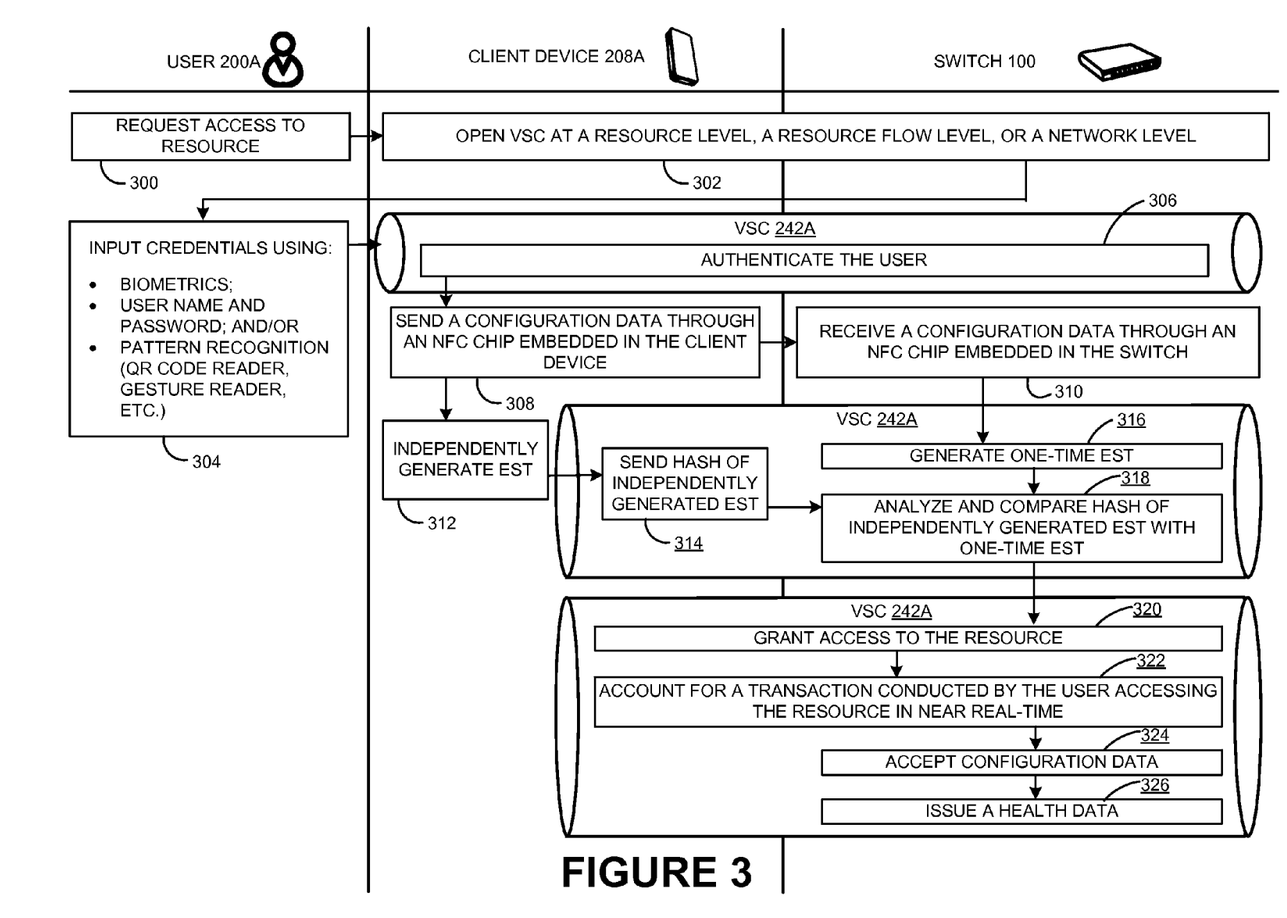
FIG. 3 illustrates a columnar process flow diagram of a user gaining access to a resource through the switch of FIG. 1, according to one or more embodiments.

Reference is now made to FIG. 3, which illustrates a columnar process flow diagram of the user 200A gaining access to a resource (such as resource 236A) through the switch 100 of FIG. 1, according to one or more embodiments. As depicted in FIG. 3, operation 300 involves the user 200A requesting access to the resource. This may involve the user 200A tapping on a display screen of a client device used by the user 200A (such as client device 208A). The display screen may display a user interface of an application (such as one of the applications 214A) stored in the device 208A. In one embodiment, the application may be the presentation layer of one of the applications 240A resident on an application server communicatively coupled to the switch 100.

In response to the request of the user 200A, operation 302 involves the switch 100 opening an in-band VSC or an out-of-band VSC to the client device 208A over the SDN. In this case, the VSC may be opened at a resource level, a resource flow level, and/or a network level for the sole purpose of authenticating and authorizing the user as required by the resource. As indicated in FIG. 2, opening a VSC at a resource level (such as for one specific software application) may involve transmitting all data packets relating to the resource from the client device 208A to the switch 100 or an application server coupled to the switch (and vice versa). Once the in-band or out-of-band VSC has been opened, operation 304 may involve the switch 100 prompting the user to input a set of credentials into the client device 208A. The set of credentials may include a biometric data received from the user 200A (wherein the biometric data may be obtained from a biometric reader coupled to the client device 208A), a user name and password, and/or a pattern recognition data received from the user 200A (wherein the pattern recognition data may be obtained from a pattern recognition reader—such as a QR code reader, a gesture reader, or a bar code reader—coupled to the client device 208A).

In response to the credentials entered by the user 200A, operation 306 may then involve the switch 100 authenticating the user 200A through the VSC opened (for example, VSC 242A). In this operation, the switch 100 may authenticate the user 200A trying to access the resource by comparing a user identity (such as user identity 202A) against a stored identity in the authentication database 244 of the control plane 120 of the switch 100. The stored identity may be a user identity entered into the authentication database 244 by a network administrator or may be a user identity stored in the authentication database 244 after a previous transaction to create, modify, or validate a user authentication data. In one embodiment, operation 304 may be considered a sub-operation of 306 and the authentication mechanism may be implemented through a multi-factor authentication procedure. In one embodiment, this procedure may comprise the user 200A having to enter two or more credentials (for example, a biometric entry and a user name/password) into the client device 208A before the switch 100 authenticates the user 200A. Operation 306 may also involve additional sub-operations which are illustrated in further detail in FIG. 4. The VSC may then be immediately closed once the authentication is complete.

Once authenticated, operation 308 may involve the client device 208A sending a configuration data or a configuration setting through an NFC chip embedded in the client device 208A. Operation 310 may involve the switch 100 receiving a configuration data from the client device 208A through an NFC chip (such as NFC chip 124) embedded in the switch 100. Operations 308 and 310 allow the user 200A to provision the switch 100 by simply holding the client device 208A close to the switch 100.

Operation 312 may involve the client device 208A independently generating an encrypted software token (EST). At the same time that the client device 208A is generating the EST, the switch 100 may also generate a one-time EST in operation 316. Operation 314 may involve the client device 208A sending a hash of the independently generated EST to the switch 100 through the VSC 242A. In operation 318, programs in the control plane 120 of the switch 100 may then analyze and compare the hash of the independently generated EST received from the client device 208A against the one-time EST generated by the switch 100.

Operation 320 may involve the switch 100 granting the user 200A access to the resource based on a result of the comparison. Furthermore, operation 322 may involve the control plane 120 of the switch 100 accounting, in near real time, for a transaction conducted by the user 200A accessing the resource. Finally, operation 324 involves the switch 100 accepting the configuration data received through the NFC chip 124. Operation 326 involves the switch 100 issuing a health data through the client device 208A (or another processing device) or through a display interface on the switch 100.

In one or more embodiments, the user 200A may refer to a human user accessing a resource on the client device 208A. In other embodiments, the user 200A may refer to another client device used by a human user to access the client device 208A. For example, the user 200A may be a human user's home computer used by the human user to access a work laptop (which may be client device 208A in this case), which may, in turn, be instructed by the home computer to open an enterprise application on the work laptop to retrieve a resource behind the switch 100. The user 200A, in this case, would be the home computer rather than the human user.

Figure 4:
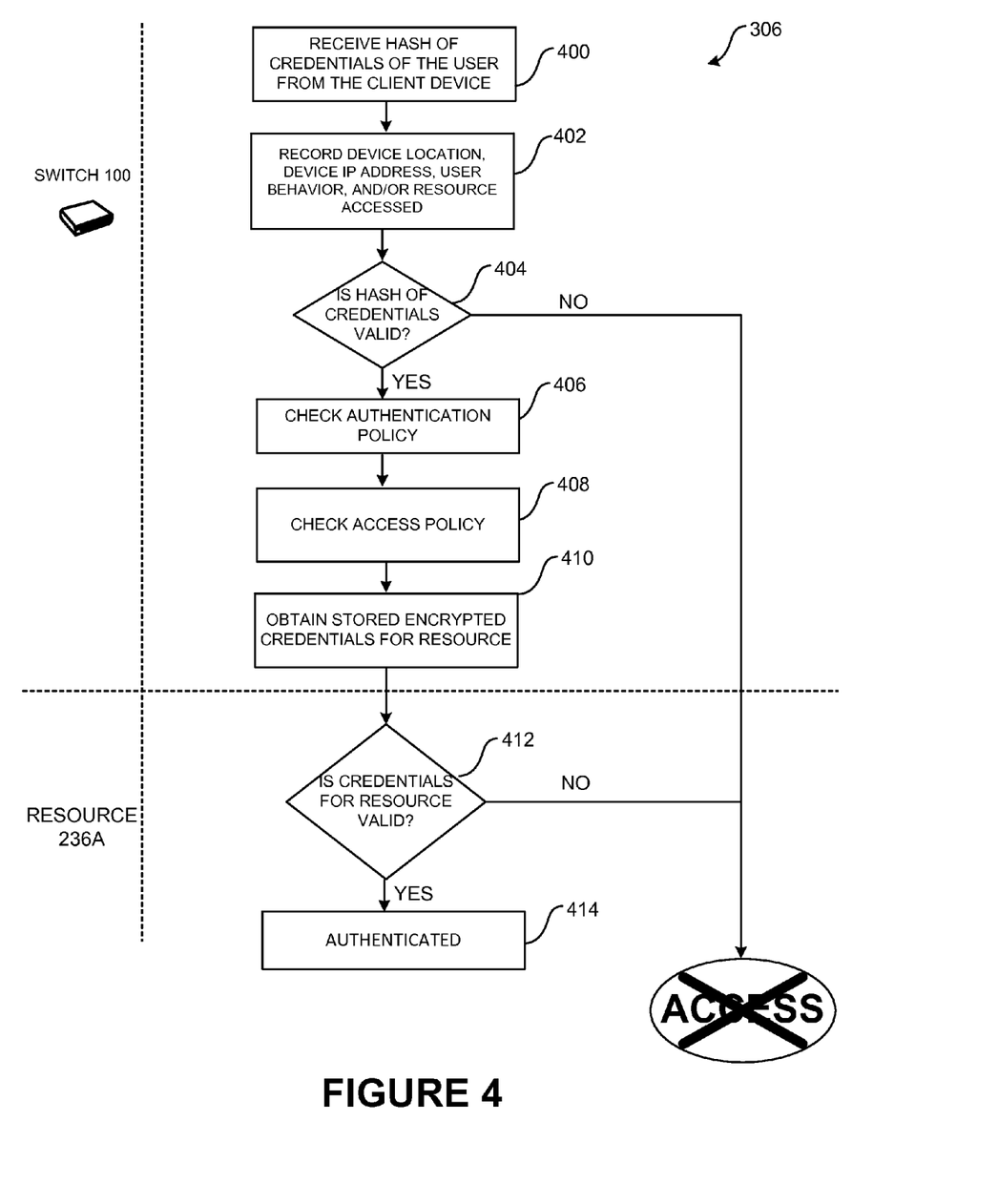
FIG. 4 illustrates a flowchart diagram of authenticating a user through the switch of FIG. 1, according to one or more embodiments.

Reference is now made to FIG. 4, which illustrates a flowchart of detailed steps to authenticate the user 200A through the switch 100 of FIG. 1, according to one or more embodiments. In particular, FIG. 4 depicts an in depth embodiment of operation 306 of FIG. 3. Operation 400 involves the switch 100 receiving a hash of the credentials of the user 200A from the client device 208A. In operation 402, the control plane 120 of the switch 100 may then record a near real-time location of the client device 208A (as provided by a GPS locator of the client device 208A) and a near real-time IP address of the client device 208A. Additionally, the switch may then begin to record a user behavior of the user 200A and a list of all resources accessed by the user 200A using the client device 208A.

In operation 404, the switch 100 may query whether the hash of the credentials received from the user 200A is valid. If the answer to this query is yes, the switch 100 may then proceed to operation 406. If the answer to the query is no, the switch 100 may then deny the user 200A access to the resource (e.g., resource 236A) by closing the VSC. In operation 406, the switch 100 may be prompted to check the authentication policy which may contain specific rules such as a user's role, a time-of-day, or other relevant policy data. Moreover, in operation 408, the switch 100 may be prompted to also check the access policy concerning the resource in question. In operation 410, the switch 100 may obtain a set of stored encrypted credentials for the resource and transmit the credentials to the resource. This may comprise a legacy username and password specifically for that given resource (and only for that given resource), permitting the switch 100 to enable single sign on (SSO) and a common credentialing system, regardless of the number of disparate resources. Finally, in operation 412, the resource (for example resource 236A) may decide whether the credentials for the resource are valid before authenticating the user 200A. If the resource 236A determines that the credentials for the resource are not valid, the resource 236A may deny the user 200A access to the resource.

As indicated above, in one embodiment, the resource 236A may reside on an application server communicatively coupled to the switch 100 or the resource 236A may reside on the switch 100 itself. Moreover, the resource 236A may have a presentation layer residing on the client device 208A (for example, resource 210A) used by the user 200A to access the resource behind the switch.

Figure 5:
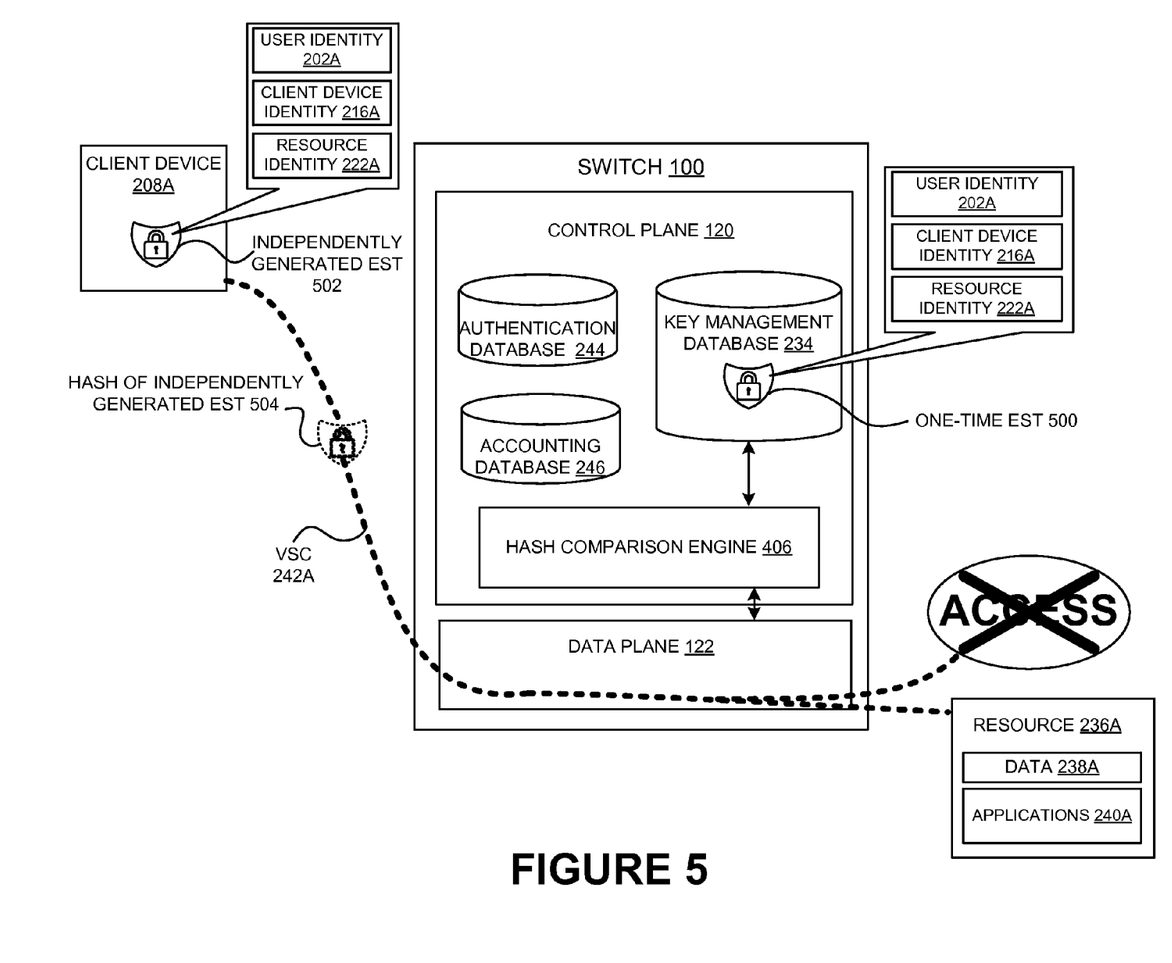
FIG. 5 illustrates an authorization of the user through the switch of FIG. 1, according to one or more embodiments.

Reference is now made to FIG. 5, which illustrates an authorization of the user 200A, previously authenticated as described in FIG. 4, through the switch 100 of FIG. 1, according to one or more embodiments. In one embodiment depicted in FIG. 5, the switch 100 may authorize the user 200A's access to a resource (for example, resource 236A) over an out-of-band VSC (for example, VSC 242A). The control plane 120 of the switch 100 may generate a one-time EST 500 based on a key agreement technique and also using information from the user identity 202A, the client device identity 216A, and/or the resource identity 222A. The user identity 202A, the client device identity 216A, and the resource identity 222A may be received from the client device 208A when the VSC was first opened. Once the one-time EST 500 has been generated, the one-time EST 500 may be stored in the key management database 234 of the control plane 120 of the switch 100. The one-time EST 500 may then be sent to a hash comparison engine 406 on the control plane 120 of the switch 100.

Also depicted in FIG. 5 is a client device (shown in FIG. 5 as client device 208A) independently generating an EST based on the user identity 202A, the client device identity 216A, and/or the resource identity 222A of the user 200A, the client device 208A and/or the resource 236A accessed, respectively. The independently generated EST 502 may then be converted to a hash of the independent generated EST 504 through a hashing algorithm such as Secure Hash Algorithm (SHA)-256 (according to U.S. Federal Information Processing Standard (FIPS) 180-4). The hash of the independently generated EST 504 may be transmitted to the switch 100 through the VSC 242A. The hash comparison engine 406 may analyze and compare the hash of the independently generated EST 504 received from the client device 208A of the user 200A against the one-time EST 500 stored in the key management database 234. The data plane 122 of the switch 100 may then grant the user 200A of the client device 208A access to the resource 236A through the VSC 242A. In one embodiment, the resource 236A may comprise of an application residing on an application server communicatively coupled to the switch 100.

Figure 6:
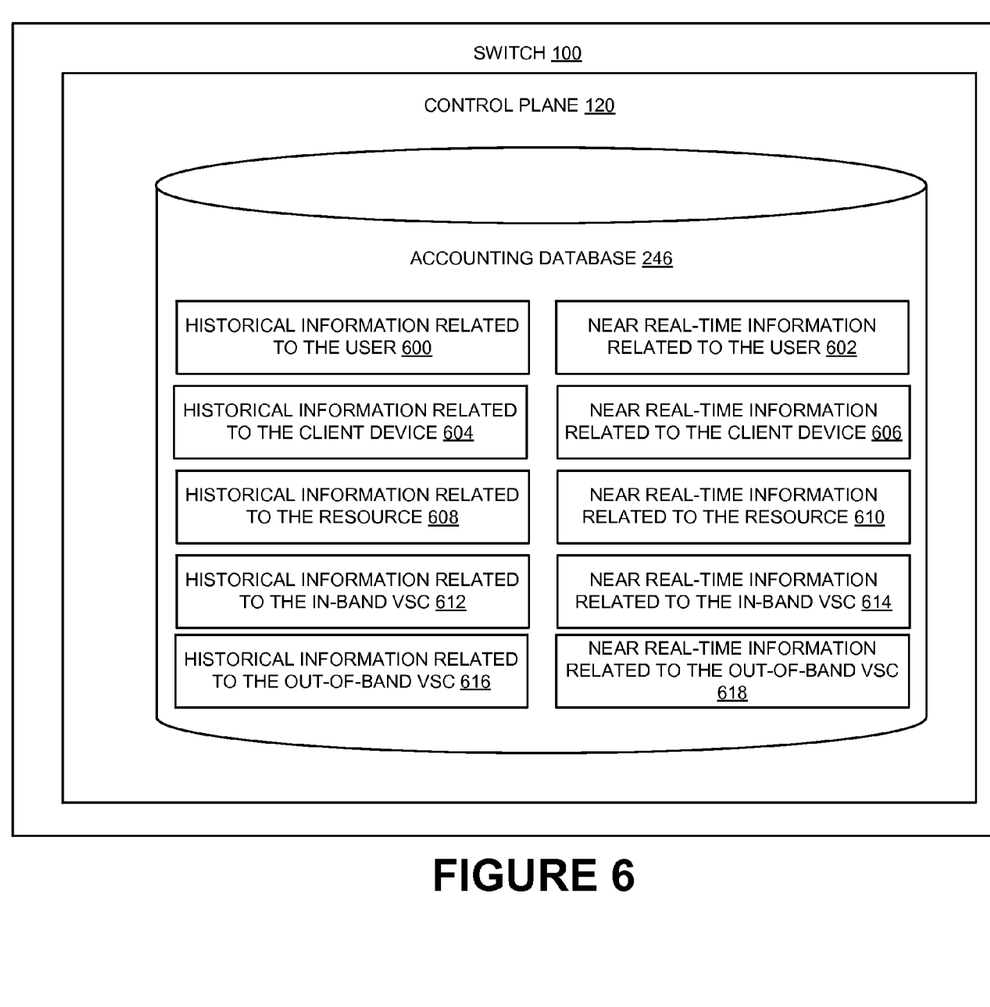
FIG. 6 illustrates an accounting database of the switch of FIG. 1, according to one or more embodiments.

Reference is now made to FIG. 6, which illustrates the switch 100 of FIG. 1 accounting for a transaction conducted by a user through the accounting database 246, according to one or more embodiments. In one embodiment, the switch 100 may store certain historical and near real-time information regarding a user (for example, user 200A), a client device (for example, client device 208A), a resource (for example, resource 210A), an in-band VSC (for example, VSC 242A), or an out-of-band VSC (for example, VSC 242B). The accounting database 246 may reside in one or more of the storage devices 106 and information from the accounting database 246 may be called upon by the control plane 120 of the switch 100.

As indicated in FIG. 6, the accounting database 246 may comprise a historical information related to the user 600, a near real-time information related to the user 602, a historical information related to the client device 604, a near real-time information related to the client device 606, a historical information related to the resource 608, a near real-time information related to the resource 610, a historical information related to the in-band VSC 612, a near real-time information related to the in-band VSC 614, a historical information related to the out-of-band VSC 616, and a near real-time information related to the out-of-band VSC 618. Historical information may be presented as a report by the resource, by the user, or by the client device on an hourly, daily, weekly, monthly, or annual basis.

An accounting application 708 (see FIG. 7) may also account for information regarding a flow, a VSC, a device, and/or a resource. In this embodiment, a flow information may comprise data packets from a user, a device, an application, a tenant, and/or a VLAN identifier. Additionally, the accounting application 708 may account for a 5 tuple (src IP, dst IP, src Port, dst Port, and/or protocol identifiers) information regarding network address translation (NAT) addresses, a flow state, a sequence number, a bandwidth low watermark, a bandwidth high watermark, a bandwidth current, a flow uptime, an L4 application protocol, and/or an L7 application protocol. Additionally, the accounting application 708 may account for information regarding a VSC such as the user identity, the device identity, the resource identity used to open the VSC, and the type of VSC opened (whether in-band or out-of-band). Furthermore, the accounting application 708 may account for the processes, applications, and data accessed by a client device and the configuration of the client device, including a manufacturer information, an operating system and applications installed on the client device, a serial number of the client device, the type of memory on the client device, and the version of the client device. By tracking this level of data, it enables a near real time security incident handling process where a network administrator can manage and monitor all traffic per user, per device, and/or per resource.

Once the user 200A has been authenticated and authorized according to the methods described above and the transaction conducted by the user 200A has been accounted for in the accounting database 246, the switch 100 can ensure a non-repudiation of the transaction to a third-party.

Figure 7:
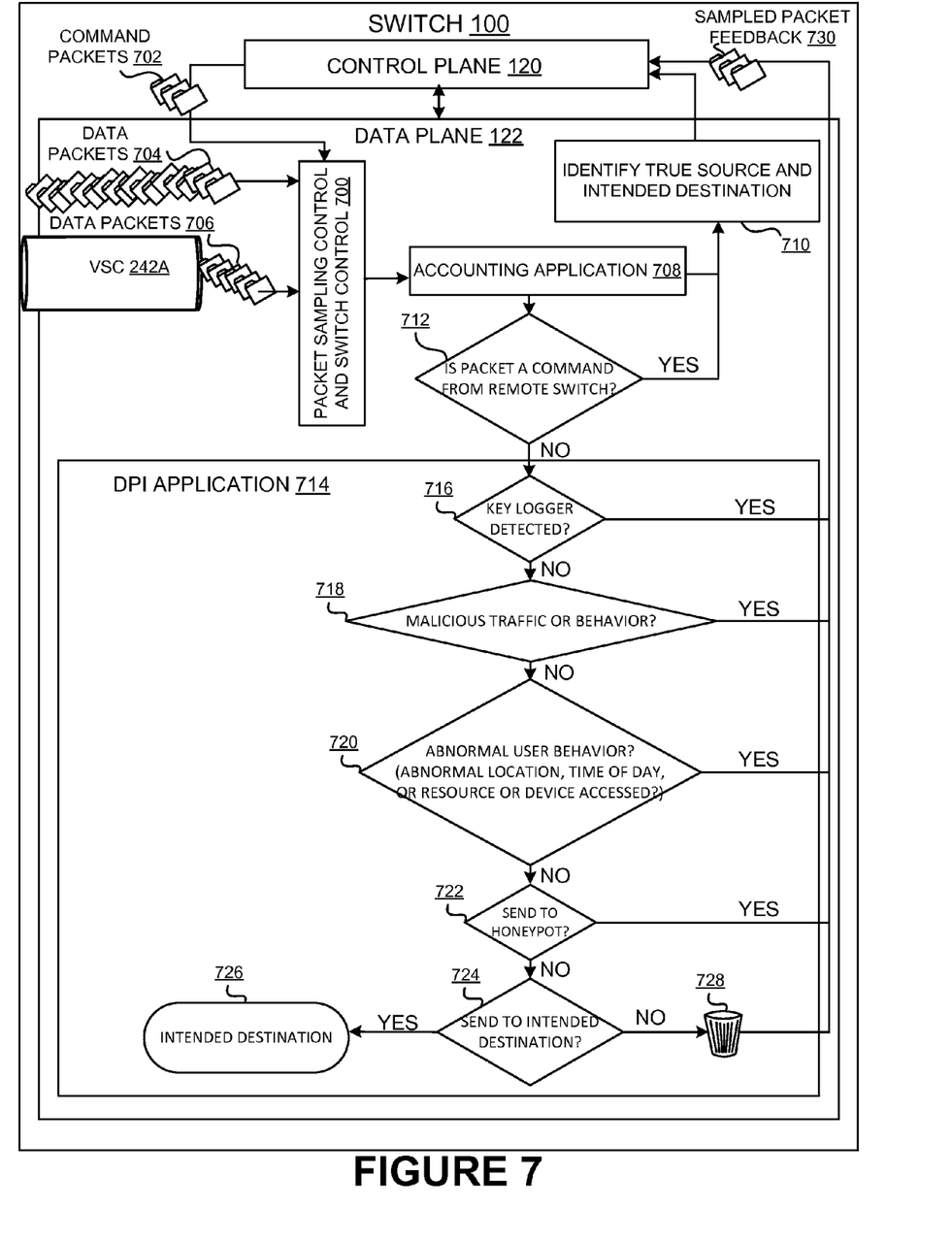
FIG. 7 illustrates operations performed by a control plane and a data plane of the switch of FIG. 1, according to one or more embodiments.

Reference is now made to FIG. 7, which illustrates operations performed by the control plane 120 and the data plane 122 of the switch 100 of FIG. 1, according to one or more embodiments. FIG. 7 shows the data plane 122 having a packet sampling control and switch control 700 block. For purposes of this section, a data packet may refer to information relating to a resource accessed by the user of a client device or the actual resource itself. In one or more embodiments, the packet sampling control and switch control 700 block may be a set of instructions stored in one of the T-CAMs of the switch 100 (for example, T-CAM 110A or T-CAM 100B). The packet sampling control and switch control 700 may receive one or more command packets 702 from the control plane 120 instructing the data plane 122 to forward network traffic a certain way to maintain confidentiality, integrity, and availability of the network, the resources, and/or the client devices. The packet sampling control and switch control 700 block may also receive data packets 706 through one or more of the VSCs (for example, VSC 242A as shown in FIG. 7) or data packets 704 not sent through a VSC. For all such packets (including commands packets 702, data packets 704, and data packets 706), the packet sampling control and switch control 700 block will forward the packets to an accounting application 708 to store the information in the accounting database 246 (see FIG. 6). In one embodiment, the data plane 122 may identify a true source and intended destination of the data packet through operation 710. However, the data packets 704 not sent through a VSC may be dropped at this point.

Once the data packets have been accounted for through the accounting application 708, operation 712 involves the data plane 122 querying whether the data packet is a command from a remote switch communicatively coupled to the SDN managed by the switch 100. If the answer to this query is yes then the packet may be sent to the control plane and the true source of the data packet may be examined. If the answer to this query is no then the data packet is sent to a deep-packet-inspection (DPI) application 714. In one embodiment, the DPI application 714 is a set of instructions stored in one or more storage devices 106 of the switch 100. In another embodiment, the DPI application 714 is a set of instructions stored in a T-CAM (either T-CAM 110A or T-CAM 110B) of the switch 100.

The DPI application 714 may first query the data packets through operation 716 that asks whether a key logger was associated with the data packet examined. If the answer to this query is yes, the data packet may be forward to the control plane 120 as part of a set of sampled packet feedback 730. If the answer to this query is no, then operation 718 may query whether malicious traffic patterns or malicious behavior was detected from the manner in which the data packet was transmitted through the VSC. Similar to the above, if the answer to this query is yes, the data packet may be forward to the control plane 120 as part of the set of sampled packet feedback 730. If the answer to this query is no, operation 720 may query whether abnormal user behavior was detected when the user requested access to the resource. Such a query may further involve analyzing the location of the client device when the request was made, the time-of-day that the request was made, and/or the type of resource accessed at the aforementioned location and time-of-day. If the answer to this query is yes, the data packet may be forwarded to the control plane 120 as part of the set of sampled packet feedback 730. If the answer to this query is no, then operation 722 may query the data packet to see if the data packet should be sent to a honeypot. In one embodiment, the honeypot may be a database used to sequester and quarantine the data packet for further analysis. If the answer to this query is yes, then the data packet would be sent to the honey and a portion of the packet would be sent back to the control plane 120 as part of the set of sampled packet feedback 730.

Finally, if the answer to this query is no, the DPI application 714 may then route the data packet to its intended destination 726 or drop the data packet through a delete program (indicated as a trash can 728 in FIG. 7). In any case, a portion of the data packet to be dropped would be routed to the control plane 120 as part of the sampled packet feedback 730. After receiving such sampled packet feedback 730 from the data plane, the control plane 120 may instruct the data plane 122 to change the routing pattern or behavior of the switch to take into account this new information. Such information provides the control plane 120 with a snapshot of the health of the SDN managed by the switch 100.

Figure 8:
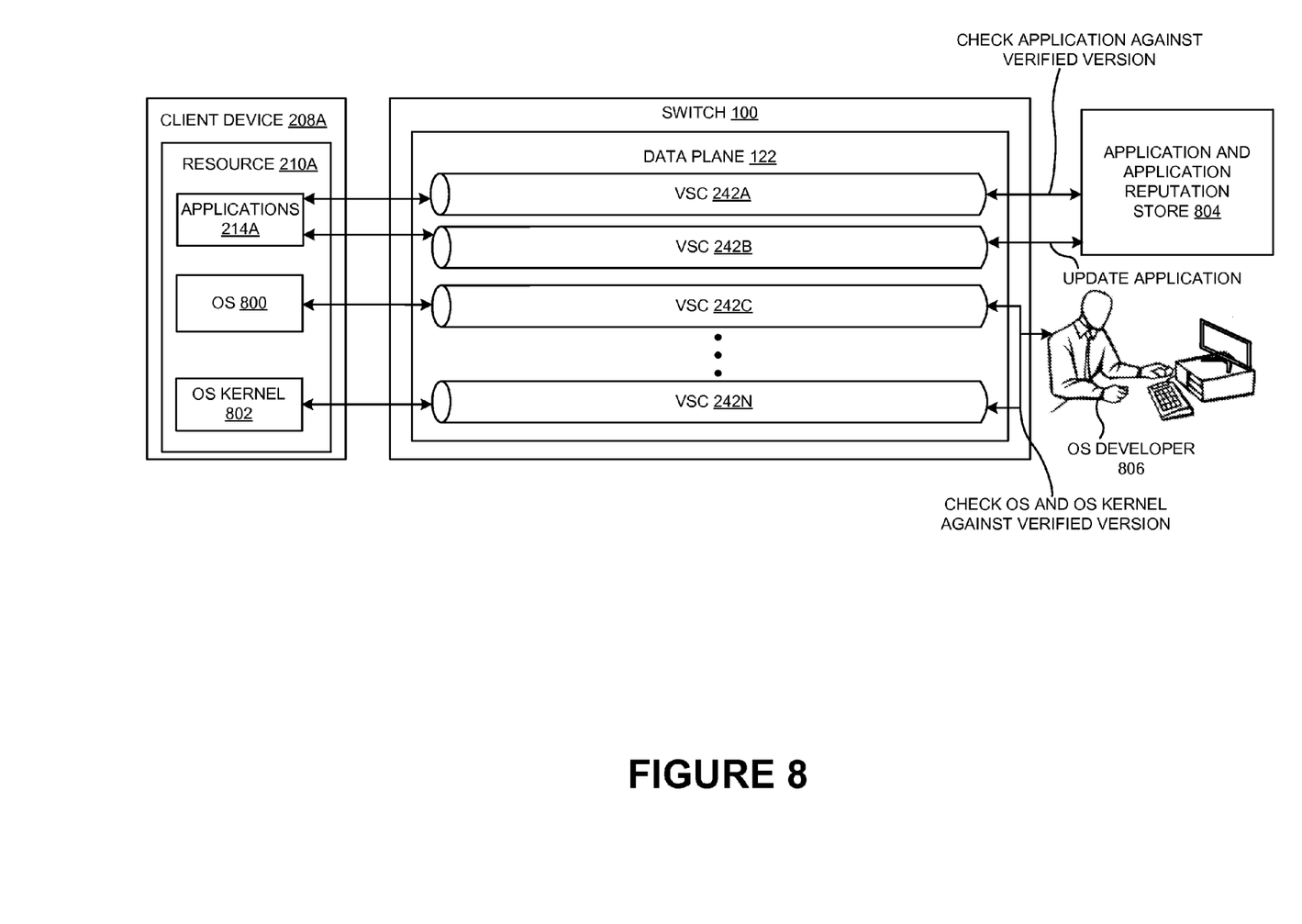
FIG. 8 illustrates verification checks and updates being transmitted through the data plane of the switch of FIG. 1, according to one or more embodiments.

Reference is now made to FIG. 8, which illustrates verification checks and updates being transmitted through the data plane of the switch of FIG. 1, according to one or more embodiments. These checks and updates are made to maintain the integrity of the client devices, the integrity of the resources, and the integrity of the network itself under constant threat from agents. Automatic updates will be pushed should the integrity be compromised. In one embodiment, a resource 210A of the client device 208A may comprise of one or more applications 214A, an OS 800, and/or an OS kernel 802. As depicted in FIG. 8, the data plane 122 of the switch 100 may check the one or more applications 214A against a verified version of the applications 214A presented in an application and application reputation store 804. In one embodiment, the application and application reputation store 804 may be a third party application store offered by a third party software developer. In another embodiment, the application and application reputation store 804 may be a program resident on the one or more storage devices 106 executable by the one or more off load engines of the switch 100. The data plane 122 of the switch 100 may perform this checking through the VSC 242A. In one embodiment, the VSC 242A may be an in-band VSC; in another embodiment, the VSC 242A may be an out-of-band VSC.

In addition, the one or more applications 214A may also receive a software update from the application and application reputation store 804 through the VSC 242B. The control plane 120 (not shown in FIG. 8) of the switch 100 may determine that the one or more applications 214A is in need of an update and may instruct the data plane 122 of the switch 100 to open the VSC 242B to query the application and application reputation store 804 for an update. In one embodiment, the VSC 242B may be an in-band VSC; in another embodiment, the VSC 242B may be an out-of-band VSC.

Similarly, the data plane 122 of the switch 100 may check the OS 800 and the OS kernel 802 against their respective verified versions, through one or more VSCs. As depicted in FIG. 8, the OS 800 of the client device 208A may be checked against a verified version of the OS provided by an OS developer 806. This checking may be performed through the VSC 242C. In one embodiment, the VSC 242C may be an in-band VSC; in another embodiment, the VSC 242C may be an out-of-band VSC. Additionally, the OS kernel 802 of the client device 208A may be verified through the VSC 242N using a verified version of the OS kernel 802 provided by the OS developer 806. In one embodiment, the VSC 242N may be an in-band VSC; in another embodiment, the VSC 242N may be an out-of-band VSC.

Figure 9:
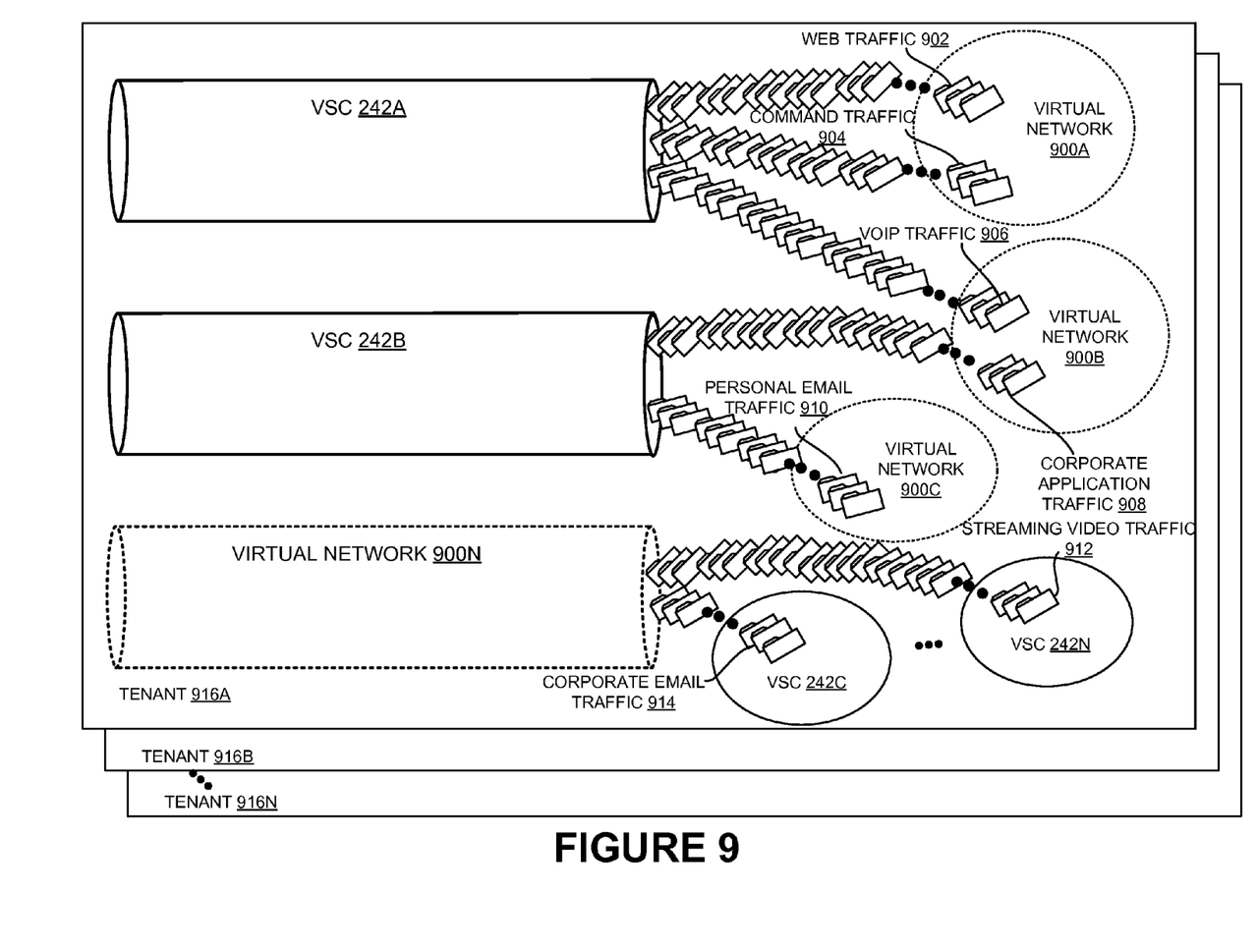
FIG. 9 illustrates the switch of FIG. 1 separating traffic in a multitenant network, according to one or more embodiments.

Reference is now made to FIG. 9, which illustrates the switch 100 of FIG. 1 separating traffic in a multitenant network, according to one or more embodiments. In this embodiment all VSCs are managed by the control panel 120 of the switch 100 (see FIG. 2). As shown in FIG. 9, VSCs 242A and 242B (depicted as large cylinders in FIG. 9) and virtual network 900N are used to deliver resource level traffic flows. Such resource level traffic flows include web traffic 902, command traffic 904, voice-over-internet (VoIP) traffic 906, corporate application traffic 908, personal email traffic 910, streaming video traffic 912, and corporate email traffic 914. In one example embodiment shown in FIG. 9, web traffic 902, command traffic 904, and VoIP traffic 906 may be delivered over VSC 242A. Command traffic 904 may refer to a set of commands received from a remote switch in the form of data packets. As indicated in FIG. 9, web traffic 902 and command traffic 904 may further be segregated into a virtual network 900A. It should be understood by one of ordinary skill in the art of networking that virtual networks 900A to 900N may refer to virtual local area networks (VLANs). In one embodiment, a VLAN is created by tagging data packets transmitted through a VSC with one or more VLAN identifiers. For more information on the creation of VLANs and virtual networking standards, please refer to the IEEE 802.1 Working Group's discussion on the topic, http://www.ieee802.org/1/.

The third stream of traffic, VoIP traffic 906, delivered through the VSC 242A may be delivered through another virtual network (shown as virtual network 900B in FIG. 9) along with the corporate application traffic 908 delivered through VSC 242B. Thus, it is possible for the control plane 120 of the switch 100 to segregate streams of network traffic from different VSCs into the same virtual network. Moreover, in an alternative embodiment not shown in FIG. 9, all three streams of traffic (for example, web traffic 902, command traffic 904, and VoIP traffic 906) may be delivered through one VSC established over one—and only one—virtual network. Also depicted in FIG. 9 is a second stream of network traffic (shown in FIG. 9 as corporate application traffic 908) delivered over VSC 242B and further segregated into virtual network 900C.

In an alternative embodiment shown at the bottom of FIG. 9, one or more VSCs (for example, VSC 242C to VSC 242N) may be established over a virtual network 900N (shown in FIG. 9 as a dotted cylinder). In this embodiment, the network traffic flow is still delivered through the VSC but several VSCs are now aggregated into one virtual network 900N. For example, streaming video traffic 912 may be delivered through the VSC 242N and corporate email traffic 914 may be delivered through the VSC 242C. A determination of whether the former network arrangement (virtual networks or VLANs established over VSCs) or the latter network arrangement (VSCs established over virtual networks or VLANs) is used may be made by a network administrator.

Furthermore, the various network arrangements depicted in FIG. 9 may be implemented by one tenant (for example, tenant 916A) or by multiple tenants as defined by one or more cloud networking standards. A tenant 916B may implement a different network arrangement on the same multitenant network. Different network arrangements may be implemented by multiple tenants (e.g., tenant 916A, tenant 916B, tenant 916N, etc.).

Additionally, the switch 100 may enable and support a quality-of-service (QoS) mechanism on one or more of the VSCs by applying one or more virtual secure network processor algorithms to a data packet to provide a circuit switched packet data functionality at an L2 or L3 networking layer.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The process flows and flow diagrams depicted in the figures do not require the particular order shown, or sequential order, to achieve desirable results. In addition, others may be provided, or steps may be eliminated from the described flows, and other components may be added to or removed from the depictions.

What is claimed is:

1. A machine-implemented method to provide an end-to-end secure transaction over a software-defined network (SDN), comprising:
    opening either an in-band virtual secure channel (VSC) or an out-of-band VSC to an enclave device capable of creating an in-band VSC and an out-of-band VSC over the SDN;
    authenticating, through a control plane of a switch managing the SDN, a user of a resource over either the in-band VSC or the out-of-band VSC;
    authorizing the user, through the control plane, access to the resource over either the in-band VSC or the out-of-band VSC; and
    accounting for a transaction conducted by the user accessing the resource, through the control plane, over either the in-band VSC or the out-of-band VSC, wherein:
        the in-band VSC is opened over an in-band network and the out-of-band VSC is opened over an out-of-band network,
        the in-band network is either a wireless network established over a licensed radio frequency band or a wired network, and
        the out-of-band network is a wireless network established over an unlicensed radio frequency band.

2. The method of claim 1, wherein at least one of the in-band VSC and the out-of-band VSC is opened at one of a resource level, a resource flow level, and a network level using at least one of a user identity, a client device identity, and a resource identity distributed through a public key infrastructure.

3. The method of claim 1, further comprising:
    receiving a configuration data from a client device of the user, through a near field communication (NFC) chip embedded in the switch, and issuing a health data of the switch to the client device through the NFC chip.

4. The method of claim 1, further comprising:
    authenticating the user of the resource by comparing a user identity against a stored identity in an authentication database of the control plane, wherein the user identity is received through at least one of the in-band VSC and the out-of-band VSC.

5. The method of claim 1, further comprising:
    authorizing the user access to the resource by:
        generating, through the control plane, a one-time encrypted software token (EST) for the user based on a key agreement technique and at least one of a user identity, a client device identity, and a resource identity,
        storing the one-time EST generated in a key management database of the control plane,
        analyzing and comparing, through a hash comparison engine of the control plane, a hash of an independently generated EST received from the client device of the user against the one-time EST stored in the key management database, and
        granting the user access to the resource through at least one of the in-band VSC and the out-of-band VSC based on a result of the comparison.

6. The method of claim 1, further comprising:
    accounting for a transaction conducted by the user accessing the resource in near real-time by storing a historical and a near real-time information related to at least one of the user, a client device used by the user, the resource, the transaction, the in-band VSC, and the out-of-band VSC in an accounting database of the control plane.

7. The method of claim 6, further comprising:
    accounting for the transaction conducted by the user by:
        performing, through a data plane of the switch managing the SDN, a deep-packet-inspection (DPI) of a data packet transmitted through at least one of the in-band VSC and the out-of-band VSC, and
        filtering out, through the data plane of the switch managing the SDN, a data packet not transmitted through at least one of the in-band VSC and the out-of-band VSC.

8. The method of claim 6, further comprising:
accounting for the transaction conducted by the user by:
identifying, through a data plane of the switch managing the SDN, a true source and a destination of a malicious data packet transmitted through at least one of the in-band VSC and the out-of-band VSC, and
redirecting and duplicating, through the data plane of the switch managing the SDN, in near-real time the malicious data packet for further analysis.

9. The method of claim 6, further comprising:
accounting for the transaction conducted by the user by:
checking, through a data plane of the switch managing the SDN, an application on the client device of the user against a verified version of the application presented in a third-party application and application reputation store through at least one of the in-band VSC and the out-of-band VSC; and
checking, through the data plane of the switch, an operating system and an operating system kernel on the client device of the user against a verified version of the operating system and the operating system kernel through at least one of the in-band VSC and the out-of-band VSC.

10. The method of claim 6, further comprising:
accounting for the transaction conducted by the user by:
issuing through a data plane of the switch managing the SDN, an update for at least one of the application, the operating system, and the operating system kernel through at least one of the in-band VSC and the out-of-band VSC.

11. A switch to manage a software defined network (SDN), comprising:
one or more off load engines, host processors, and co-processors embedded in the switch;
one or more near field communication (NFC) chips communicatively coupled to the one or more host processors;
one or more storage devices and memory devices communicatively coupled to the one or more off load engines, host processors, and co-processors; and
one or more programs, wherein the one or more programs are stored in the one or more storage devices and memory devices and executable by the one or more off load engines, host processors, and co-processors, with the one or more programs comprising:
instructions to open either an in-band virtual secure channel (VSC) or an out-of-band VSC to an enclave device capable of creating an in-band VSC and an out-of-band VSC over the SDN,
instructions to authenticate, through the control plane of the switch, a user of a resource over either the in-band VSC or the out-of-band VSC,
instructions to authorize the user, through the control plane, access to the resource over either the in-band VSC or the out-of-band VSC, and
instructions to account, for a transaction conducted by the user using the resource, through the control plane, over either the in-band VSC or the out-of-band VSC, wherein:
the in-band VSC is opened over an in-band network and the out-of-band VSC is opened over an out-of-band network,
the in-band network is either a wireless network established over a licensed radio frequency band or a wired network, and
the out-of-band network is a wireless network established over an unlicensed radio frequency band.

12. The switch of claim 11, wherein at least one of the in-band VSC and the out-of-band VSC is opened at one of a resource level, a resource flow level, and a network level using at least one of a user identity, a client device identity, and a resource identity distributed through a public key infrastructure.

13. The switch of claim 11, further comprising:
instructions to receive a configuration data from a client device of the user, through the one or more NFC chips embedded in the switch, and issue a health data of the switch to the client device through the one or more NFC chips.

14. The switch of claim 11, further comprising:
instructions to authenticate the user of the resource by comparing a user identity against a stored identity in an authentication database of the control plane, wherein the user identity is received through at least one of the in-band VSC and the out-of-band VSC.

15. The switch of claim 11, further comprising:
instructions to authorize the user access to the resource with further instructions to:
generate, through the control plane, a one-time encrypted software token (EST) for the user based on a key agreement technique and at least one of a user identity, a client device identity, and a resource identity,
store the one-time EST generated in a key management database of the control plane,
analyze and compare, through a hash comparison engine of the control plane, a hash of an independently generated EST received from the client device of the user against the one-time EST stored in the key management database, and
grant the user access to the resource through at least one of the in-band VSC and the out-of-band VSC based on a result of the comparison.

16. The switch of claim 11, further comprising:
instructions to account for a transaction conducted by the user accessing the resource in near real-time by storing a historical and a near real-time information related to at least one of the user, a client device used by the user, the resource, the transaction, the in-band VSC, and the out-of-band VSC in an accounting database of the control plane.

17. The switch of claim 16, further comprising:
instructions to account for the transaction conducted by the user with further instructions to:
perform, through a data plane of the switch, a deep-packet-inspection (DPI) of a data packet transmitted through at least one of the in-band VSC and the out-of-band VSC, and
filter out, through the data plane of the switch, a data packet not transmitted through at least one of the in-band VSC and the out-of-band VSC.

18. The switch of claim 16, further comprising:
instructions to account for the transaction conducted by the user with further instructions to:
identify, through a data plane of the switch, a true source and a destination of a malicious data packet transmitted through at least one of the in-band VSC and the out-of-band VSC, and
redirect and duplicate, through the data plane of the switch, in near-real time the malicious data packet for further analysis.

19. The switch of claim 16, further comprising:

instructions to account for the transaction conducted by the user with further instructions to:

check, through a data plane of the switch, an application on the client device of the user against a verified version of the application presented in a third-party application and application reputation store through at least one of the in-band VSC and the out-of-band VSC, and     check, through a data plane of the switch, an operating system and an operating system kernel on the client device of the user against a verified version of the operating system and the operating system kernel through at least one of the in-band VSC and the out-of-band VSC.

20. The switch of claim 16, further comprising:

instructions to account for the transaction conducted by the user with further instructions to:

issue, through a data plane of the switch, an update for at least one of the application, the operating system, and the operating system kernel through at least one of the in-band VSC and the out-of-band VSC.

\* \* \* \* \*